US009780975B1

(12) United States Patent
Kwak et al.

(10) Patent No.: US 9,780,975 B1
(45) Date of Patent: Oct. 3, 2017

(54) FASTER-THAN-NYQUIST (FTN) SIGNAL TRANSMISSION APPARATUS AND METHOD THEREOF

(71) Applicant: ELECTRONICS AND TELECOMMUNICATIONS RESEARCH INSTITUTE, Daejeon (KR)

(72) Inventors: Sang Woon Kwak, Daejeon (KR); Joung Il Yun, Daejeon (KR); Myung Sun Baek, Daejeon (KR); Young Su Kim, Daejeon (KR); Hyoung Soo Lim, Daejeon (KR); Nam Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/291,832

(22) Filed: Oct. 12, 2016

(30) Foreign Application Priority Data

May 9, 2016 (KR) ........................ 10-2016-0056544

(51) Int. Cl.
*H04L 25/03* (2006.01)
*H04L 25/06* (2006.01)
*H04L 27/26* (2006.01)
*H04B 1/04* (2006.01)

(52) U.S. Cl.
CPC ......... *H04L 25/03834* (2013.01); *H04B 1/04* (2013.01); *H04L 25/03343* (2013.01); *H04L 25/068* (2013.01); *H04L 27/2613* (2013.01); *H04L 27/2644* (2013.01)

(58) Field of Classification Search
CPC ......... H04L 25/03834; H04L 25/03343; H04L 25/068; H04L 27/2613; H04L 27/2644; H04B 1/04
USPC ........................................................ 375/296
See application file for complete search history.

(56) References Cited

U.S. PATENT DOCUMENTS

| 8,514,966 | B2 | 8/2013 | Wajcer et al. | |
| 2007/0161361 | A1 | 7/2007 | Vaisanen et al. | |
| 2011/0194645 | A1* | 8/2011 | Kim .................. | H04L 27/3488 375/295 |
| 2012/0039247 | A1* | 2/2012 | Wajcer .............. | H04B 7/18513 370/316 |
| 2015/0010118 | A1* | 1/2015 | Beidas ............. | H04L 25/03006 375/341 |

(Continued)

FOREIGN PATENT DOCUMENTS

KR 10-2015-0033883 A 4/2015

*Primary Examiner* — Helene Tayong

(57) ABSTRACT

A Faster-Than-Nyquist (FTN) signal transmission apparatus and method thereof. The signal transmission apparatus includes a pilot interference estimator and compensator configured to estimate interference on pilot symbols by a Faster-Than-Nyquist (FTN) signal generated by FTN modulating a sequence of data symbols, and generate a compensated pilot symbol sequence to cancel the estimated interference; a pilot FTN modulator configured to generate an FTN pilot signal in which inter-pilot symbol interference does not occur, by performing FTN pulse-shaping on the compensated pilot symbol sequence; and a transmitter configured to transmit an FTN data signal and the FTN pilot signal.

20 Claims, 3 Drawing Sheets

(56) References Cited

U.S. PATENT DOCUMENTS

2015/0110216 A1\* 4/2015 Bajcsy ................... H04B 1/40
  375/285
2016/0112229 A1\* 4/2016 Lin ..................... H04L 27/2631
  370/203
2016/0248457 A1\* 8/2016 Intrater ................ H04B 1/1027

\* cited by examiner

FASTER-THAN-NYQUIST (FTN) SIGNAL TRANSMISSION APPARATUS AND METHOD THEREOF

CROSS-REFERENCE TO RELATED APPLICATION(S)

This application claims the benefit under 35 USC §119(a) of Korean Patent Application No. 10-2016-0056544, filed on May 9, 2016, in the Korean Intellectual Property Office, the entire disclosure of which is incorporated herein by reference for all purposes.

BACKGROUND

1. Field

The following description relates to signal processing and transmission technologies, and more particularly, to a Faster-Than-Nyquist (FTN) signal processing and transmission technologies.

2. Description of Related Art

In general signal transmission schemes, a pulse shape and speed are determined such that a signal can be transmitted within a given bandwidth, with no inter-symbol interference. Such pulse shaping is referred to as a Nyquist pulse shaping, which has a maximum transfer rate in a given bandwidth with no inter-symbol interference.

In order to increase a transfer rate of a transmission system that employs the Nyquist pulse shaping method, a signal is transmitted by narrowing a time interval of pulse shaping, or a symbol modulation level is increased. However, narrowing of the time interval of pulse shaping requires wider bandwidth, while increasing of symbol modulation level requires a higher signal-to-noise ratio to achieve the same amount of signal detection. For these reasons, research on an FTN transmission technology that can increase a transfer rate within the same bandwidth, without using a higher modulation level, has been conducted.

The FTN transmission technology is a method to transmit a signal by reducing a pulse period while preserving a form of pulse shaping that is limited by a bandwidth. This method causes inter-symbol interference (ISI) to necessarily occur in a transmission signal, but can achieve a higher transmission speed in the same bandwidth, as compared to the conventional Nyquist shaping method. If a signal is transmitted with the preserved pulse shape and at shorter intervals than a transmission interval at which the signal can be transmitted without ISI, inter-symbol overlap occurs, which leads to interference occurring. In this case, if a receiving apparatus has prior knowledge about a pattern of interference caused by said overlap, it is possible to generate a reference signal by creating artificial interference in the original signal and reconstruct a signal from which interference is removed by comparing the received signal with the reference signal.

In most radio communication systems, a receiver uses a pilot signal for initial system synchronization and carrier phase synchronization. The pilot signal does not carry actual data, but is used for coherent detection for which a transmitter and a receiver transmits and receives a designated signal. In a system to which an FTN transmission technology is applied, a pilot signal is distorted due to ISI.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to a Faster-Than-Nyquist (FTN) signal transmission apparatus and method thereof, which can transmit a pilot signal without being distorted and without using an additional bandwidth in a communication system to which an FTN transmission technology is applied.

In one general aspect, there is provided a signal transmission apparatus including: a pilot interference estimator and compensator configured to estimate interference on pilot symbols by a Faster-Than-Nyquist (FTN) signal generated by FTN modulating a sequence of data symbols, and generate a compensated pilot symbol sequence to cancel the estimated interference; a pilot FTN modulator configured to generate an FTN pilot signal in which inter-pilot symbol interference does not occur, by performing FTN pulse-shaping on the compensated pilot symbol sequence; and a transmitter configured to transmit an FTN data signal and the FTN pilot signal.

The signal transmission apparatus may further include: a data symbol modulator configured to modulate data symbols; a first symbol mapper configured to map a sequence of the modulated data symbols to a sequence of zero pilot symbols; and a data FTN modulator configured to generate the FTN data signal by performing FTN pulse-shaping on an output symbol sequence of the first symbol mapper, and provide the generated FTN data signal to the pilot interference estimator and compensator.

The first symbol mapper may be configured to output a symbol sequence by inserting 0 at a pilot symbol position in the sequence of modulated data symbols.

The signal transmission apparatus may further include: a pilot symbol generator configured to generate the pilot symbols; and a second symbol mapper configured to map a sequence of generated pilot symbols to a sequence of zero data symbols and provide the pilot interference estimator and compensator with an output sequence resulting from the mapping.

The second symbol mapper may be configured to output a symbol sequence by inserting 0 at a data symbol position in the sequence of generated pilot symbols.

The pilot interference estimator and compensator may be configured to receive the FTN data signal and the output sequence of the second symbol mapper and generate the compensated pilot symbol sequence by subtracting a pilot symbol position value of the FTN data signal from the pilot symbol position of the output sequence of the second symbol mapper.

The pilot FTN modulator may be configured to generate the FTN pilot signal by performing FTN pulse-shaping on the compensated pilot symbol sequence from the pilot interference estimator and compensator, independently of FTN pulse-shaping on the data symbols.

The pilot FTN modulator may be configured to FTN pulse-shape a pilot compensation signal using a pilot FTN transmission parameter, in which the pilot FTN transmission parameter is smaller than a data symbol FTN transmission parameter.

The pilot FTN modulator may be configured to FTN pulse-shape a pilot compensation signal using a pilot FTN transmission parameter, wherein a product of the pilot FTN transmission parameter and a greatest common denominator of pilot symbol intervals is a positive integer.

The pilot FTN modulator may be configured to place the pilot signals such that the product of the pilot FTN transmission parameter and a greatest common denominator of pilot symbol intervals does not become 1.

The pilot FTN modulator may be configured to perform FTN pulse-shaping and pilot symbol placement such that both a first requirement that a pilot FTN transmission parameter is smaller than a data symbol FTN transmission parameter and a second requirement that a product of the pilot FTN transmission parameter and a greatest common denominator of pilot symbol intervals is a positive integer can be meet.

The signal transmission apparatus may further include a combiner configured to generate an FTN transmission signal by combining the FTN data signal and the FTN pilot signal and provide the generated FTN transmission signal to the transmitter.

In another general aspect, there is provided a signal transmission method including: estimating interference on pilot symbols by a Faster-Than-Nyquist (FTN) signal generated by FTN modulating a sequence of data symbols, and generating a compensated pilot symbol sequence to cancel the estimated interference; determining a pilot FTN transmission parameter; generating an FTN pilot signal in which inter-pilot symbol interference does not occur, by performing FTN pulse-shaping on the compensated pilot symbol sequence; and transmitting an FTN data signal and the FTN pilot signal.

The signal transmission method may further include: modulating data symbols and mapping a sequence of the modulated data symbols to a sequence of zero pilot symbols to produce a first output symbol sequence; generating the FTN data signal by performing FTN pulse-shaping on the first output symbol sequence; and generating pilot symbols and mapping a sequence of the generated data symbols to a sequence of zero data symbols to produce a second output symbol sequence.

The generation of the compensated pilot symbol sequence may include receiving the FTN data signal and the second output sequence and generating the compensated pilot symbol sequence by subtracting a pilot symbol position value of the FTN data signal from the pilot symbol position of the second output sequence.

The pilot FTN transmission parameter may be determined to be smaller than a data symbol FTN transmission parameter.

The pilot FTN transmission parameter may be determined such that a product of the pilot FTN transmission parameter and a greatest common denominator of pilot symbol intervals is a positive integer.

The generation of the FTN pilot signal may include performing FTN pulse-shaping on the compensated pilot symbol sequence from the pilot interference estimator and compensator, independently of FTN pulse-shaping on the data symbols The generation of the FTN pilot signal may include performing FTN pulse-shaping and pilot symbol placement such that both a first requirement that a pilot FTN transmission parameter is smaller than a data symbol FTN transmission parameter and a second requirement that a product of the pilot FTN transmission parameter and a greatest common denominator of pilot symbol intervals is a positive integer can be meet.

The generation of the FTN pilot signal may include placing the pilot signals such that the product of the pilot FTN transmission parameter and a greatest common denominator of pilot symbol intervals does not become 1.

Other features and aspects will be apparent from the following detailed description, the drawings, and the claims.

Figure 1:
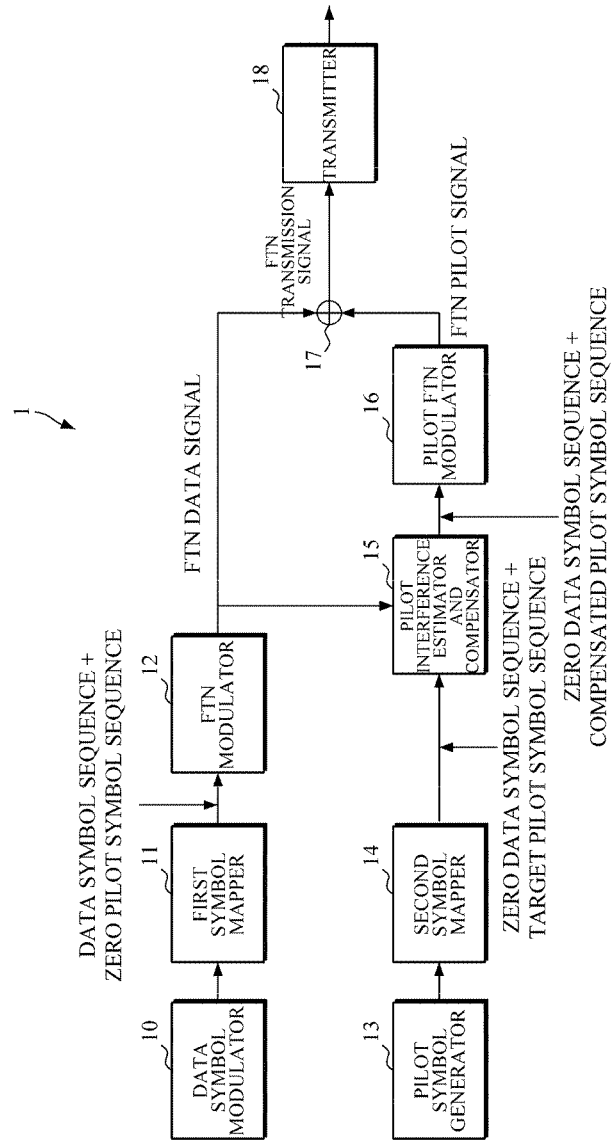
FIG. 1 is a diagram illustrating a signal transmission apparatus according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

In the following description, a detailed description of known functions and configurations incorporated herein will be omitted when it may obscure the subject matter with unnecessary detail.

Terms used throughout this specification are defined in consideration of functions according to exemplary embodiments, and can be varied according to a purpose of a user or manager, or precedent and so on. Therefore, definitions of the terms should be made on the basis of the overall context.

It will be understood that each block of the flowchart illustrations and/or block diagrams, and combinations of blocks in the flowchart illustrations and/or block diagrams in the accompanying drawings, can be implemented by computer program instructions (execution engine). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the accompanying drawings illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

The present disclosure will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

FIG. 1 is a diagram illustrating a signal transmission apparatus according to an exemplary embodiment.

Referring to FIG. 1, the signal transmission apparatus 1 includes a data symbol modulator 10, a first symbol mapper 11, a data Faster-Than-Nyquist (FTN) modulator 12, a pilot symbol generator 13, a second symbol mapper 14, a pilot interference estimator and compensator 15, a pilot FTN modulator 16, a combiner 17, and a transmitter 18.

FTN transmission techniques cause inter-symbol-interference (ISI) to necessarily occur, and hence a pilot signal is distorted. To avoid such distortion, a method to estimate an interference that affects a pilot signal, cancel the interference from the pilot signal, and transmit a resulting pilot signal may be considered. By employing said method, it may be possible to design a pilot signal without distortion. However, depending on the way of pulse-shaping of a pilot compensation signal, a loss of FTN transmission gain or a new interference may occur. For example, if a pilot compensation signal for interference cancellation is Nyquist pulse-shaped, a bandwidth needed by a transmission signal is widened, and, accordingly, a transmission efficiency gain which is achieved by FTN transmission is lost. If the same FTN pulse shaping method as applied to a data symbol is employed, a pilot signal is generated by compensating for interference by a proximal data symbol, but interference may occur between adjacent pilot signals during the pulse-shaping of the compensated pilot signal, which may result in distortion of a pilot compensation signal.

The present disclosure suggests a technology for a pilot symbol placement and pulse-shaping which allows a pilot signal of a desired value to be transmitted without being distorted as well as without a loss of FTN transmission gain. For example, data symbol interference due to FTN pulse shaping process for a data symbol is estimated, and a compensated pilot symbol sequence is generated by taking into account a data symbol interference added at a pilot symbol position. In addition, the compensated pilot symbol sequence undergoes FTN pulse-shaping that meets pre-set conditions (which is done independently of data symbols), and an FTN pilot signal is generated in such a manner that inter-pilot symbol interference does not occur. The aforesaid pilot symbol placement and pulse-shaping method is applicable to FTN-based broadcasting and communication system. Hereinafter, the configuration of a signal transmission apparatus that performs the aforementioned pilot symbol placement and pulse shaping will be described with reference to FIG. 1.

The data symbol modulator 10 modulates a data symbol, and the pilot symbol generator 13 generates a target pilot symbol. The data symbol modulation method is not limited to any specific method, and may use, for example, BPSK modulation or QPSK modulation.

The first symbol mapper 11 maps the sequence of data symbols modulated by the data symbol modulator 10 to a sequence of zero pilot symbols. The second symbol mapper 14 maps the sequence of pilot symbols generated by the pilot symbol generator 13 to a sequence of zero data symbols. The symbol sequence output from the first symbol mapper 11 and the symbol sequence output from the second symbol mapper 14 are the same in length, and the two mappers 11 and 14 use the same mapping method for the data symbols and the pilot symbols, except that the first symbol mapper 11 inserts 0 at a pilot symbol position in the course of symbol mapping while the second symbol mapper 14 inserts 0 at a data symbol position in the course of symbol mapping. Accordingly, the output sequence from the first symbol mapper 11 is a symbol sequence in which 0 is inserted at a pilot symbol position in the data symbol sequence, and the output sequence from the second symbol mapper 14 is a symbol sequence in which 0 is inserted at a data symbol position in a target pilot symbol sequence.

The data FTN modulator 12 generates a FTN data signal by performing FTN pulse shaping for data symbols on the symbol sequence output from the first symbol mapper 11. In the FTN data signal, FTN interference by adjacent data symbols is added to a position value that corresponds to a pilot symbol.

The pilot interference estimator and compensator 15 estimates an interference on pilot symbols by an FTN data signal that is generated by FTN modulating a data symbol sequence, and it generates a compensated pilot symbol sequence that cancels the estimated interference. The pilot interference estimator and compensator 15 receives the FTN data signal from the data FTN modulator 12 and the output sequence from the second symbol mapper 14, and generates a compensated pilot symbol sequence by subtracting a pilot symbol position value of the FTN data signal from the pilot symbol position in the output sequence from the second symbol mapper 14 ('−' operation). At this time, the pilot symbol position is compensated only, and the data symbol position is 0.

The pilot FTN modulator 16 performs FTN pulse-shaping on the compensated pilot symbol sequence from the pilot interference estimator and compensator 15, and generates an FTN pilot signal in which inter-pilot symbol interference does not occur. The pilot FTN modulator 16 may generate the FTN pilot signal through FTN modulation of specific conditions that do not cause inter-pilot symbol interference in the compensated pilot symbol sequence. The FTN pulse-shaping by the pilot FTN modulator 16 may be carried out independently of the FTN pulse-shaping by the data FTN modulator 12.

The combiner 17 generates an FTN transmission signal by combining the FTN pilot signal generated by the FTN modulator 16 and the FTN data signal generated by the data FTN modulator 12. Then, the transmitter 18 transmits the generated FTN transmission signal to a signal receiving apparatus.

According to the exemplary embodiment, the FTN pulse-shaping by the pilot FTN modulator 16 and the pilot symbol placement by the second symbol mapper 14 meet the following requirements. The pilot compensation signal and the data symbols are all FTN pulse-shaped and then transmitted, for which a pilot FTN transmission parameter $\tau_{pilot}$ is set to be smaller than a data symbol FTN transmission parameter $\tau_{data}$, as shown in Expression 1, in order to prevent a loss of FTN transmission gain due to pilot symbols. The pilot FTN transmission parameter $\tau_{pilot}$ may have a value ranging from 0 to 1. A form of pulse shaping for the FTN pilot signal may be determined by the pilot FTN transmission parameter $\tau_{pilot}$.

$$\tau_{pilot} < \tau_{data} \quad (1)$$

A pilot signal placement and the pilot FTN transmission parameter $\tau_{pilot}$ are set to meet a requirement as shown in Expression 2 while satisfying the requirement as shown in Expression 1.

$$\tau_{pilot} \cdot G_{interval} = \text{integer} \quad (2)$$

Here, $G_{interval}$ is the greatest common denominator of intervals among pilot symbols during the placement of pilot signals. According to Expression 2, the product of $\tau_{pilot}$ and $G_{interval}$ must be a positive integer. If the requirements of Expression 1 and Expression 2 are all met, a data FTN transmission efficiency gain can be preserved in the FTN transmission signal while distortion of the pilot signal can be prevented.

For example, if the data symbols and the pilot compensation signal are each FTN pulse-shaped with FTN transmission parameters which are $\tau_{data} > 0.5$ and $\tau_{pilot} = 0.5$, and the pilot signal is placed at either even-numbered positions or odd-numbered positions in the transmission signal (i.e., $G_{interval}$ is 2 or a multiple of 2), the pilot symbols can be transmitted without being distorted, as well as without a loss of data FTN transmission gain. As $\tau_{pilot} = 0.5$, zero-crossing is performed on the pilot symbols that are apart from a specific pilot symbol at an interval of $$\frac{1}{0.5} = 2,$$

and hence there is no FTN interference influence. The transmission signal waveform for this case is shown in FIG. 2.

$G_{interval}$ is the greatest common denominator of intervals among pilot symbols. When the number of pilot symbols is $N_{pilot}$, the number of pilot symbol intervals is $N_{pilot} - 1$, and $G_{interval}$ is the greatest common denominator of $(N_{pilot} - 1)$ number of pilot symbol intervals. In this case, if $G_{interval}$ is 1, $\tau_{pilot} = 1$ in order to meet Express 2, that is, the pilot compensation signal is to be transmitted in Nyquist transmission scheme, and hence FTN transmission efficiency gain cannot be achieved. Therefore, a pilot pattern is designed by taking into account $\tau_{data}$ and $\tau_{pilot}$, such that $G_{interval}$ does not become 1.

In conclusion, the signal transmission method according to the present disclosure is a method to provide a structure in which data symbols and pilot symbols are generated and pulse-shaped independently of each other, and to determine $\tau_{pilot}$ such that pilot symbols can be zero-crossed to an extent that do not use additional bandwidth, thereby avoiding interference between the pilot symbols.

Figure 2:
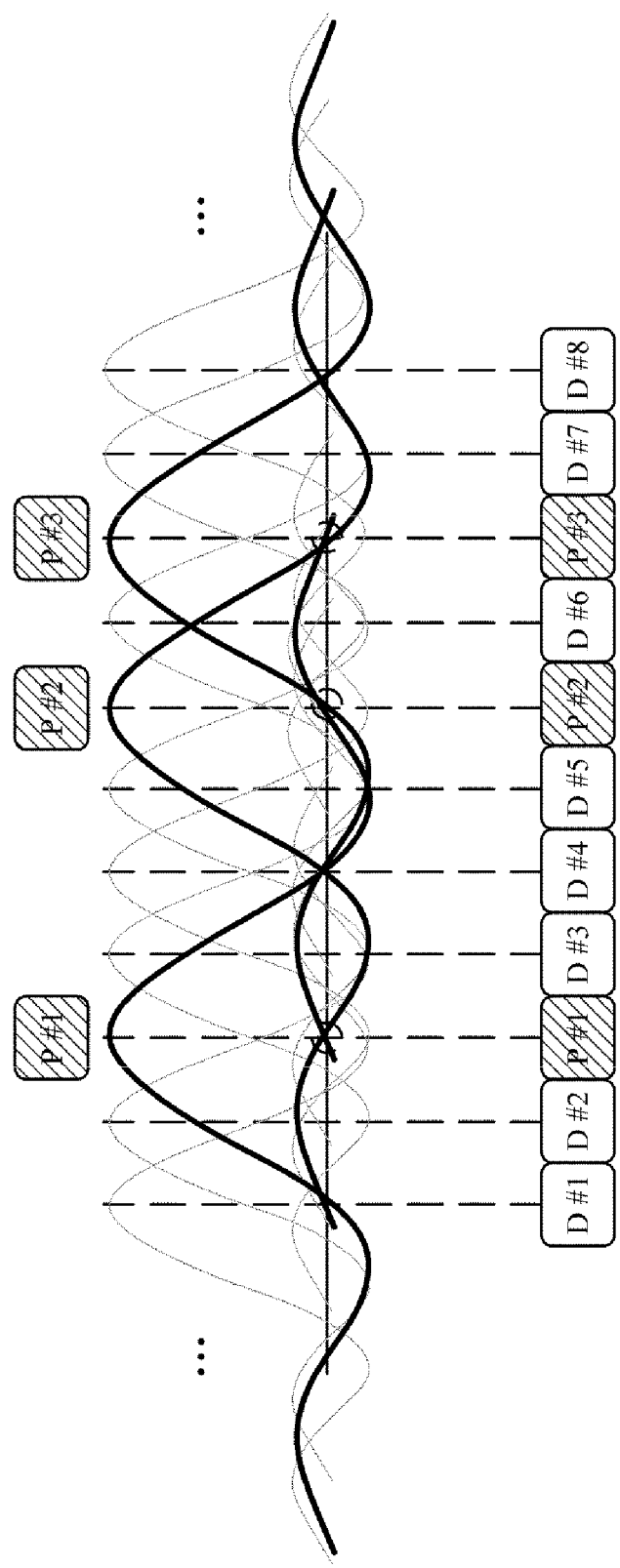
FIG. 2 is a diagram illustrating a waveform of a transmission signal to which pilot signal placement and FTN pulse-shaping are applied according to the exemplary embodiment.

FIG. 2 is a diagram illustrating a waveform of a transmission signal to which pilot signal placement and FTN pulse-shaping are applied according to the exemplary embodiment.

Referring to FIG. 2, $G_{interval}$ is 2 or a multiple of 2, and pilot signals P#1, P#2, and P#3 are placed at odd-numbered positions in the transmission signal. It is seen that pulses on which the pilot signals P#1, P#2, and P#3 are transmitted are zero-crossed at each pilot position and hence no interference occurs. In FIG. 2, an axis may be time or frequency.

Figure 3:
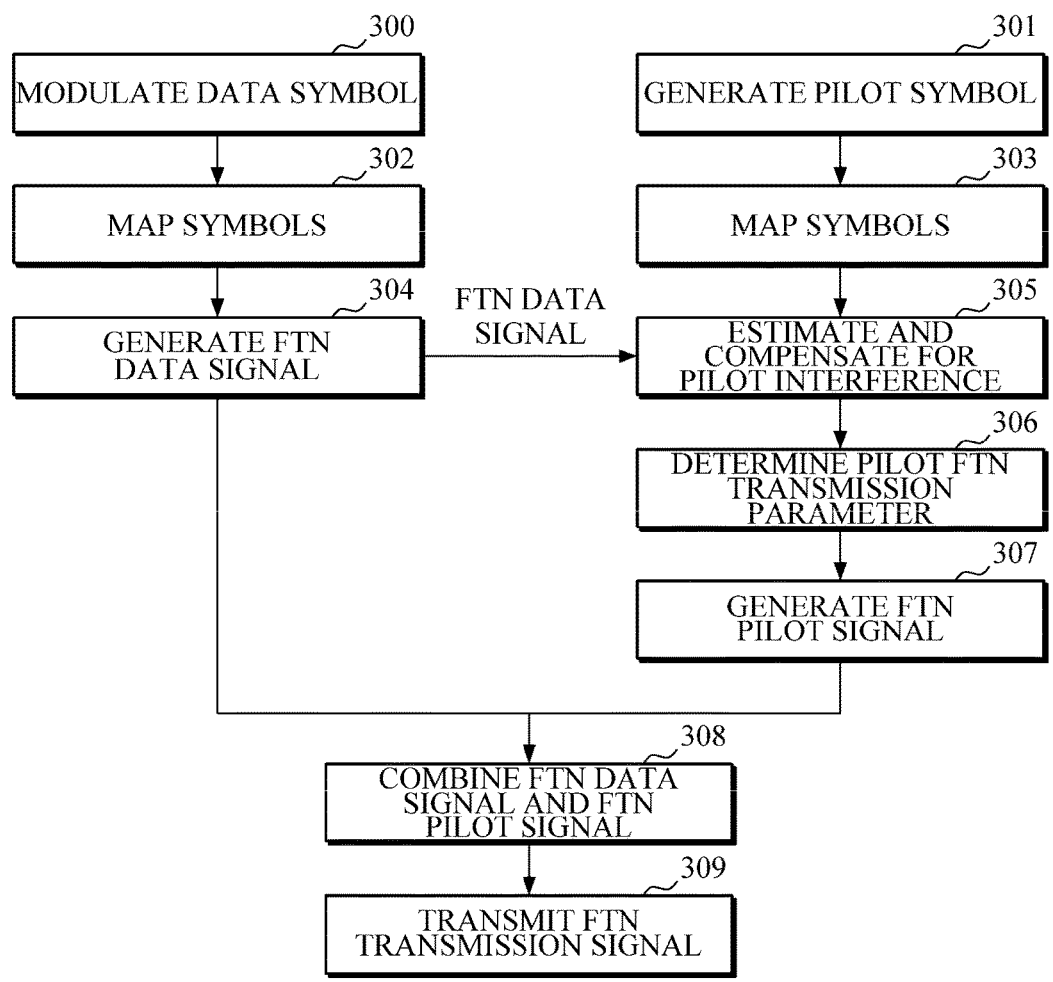
FIG. 3 is a flowchart illustrating a method of transmitting an FTN signal according to an exemplary embodiment.

FIG. 3 is a flowchart illustrating a method of transmitting an FTN signal according to an exemplary embodiment.

Referring to FIGS. 1 and 3, the signal transmission apparatus modulates data symbols, as depicted in 300, and maps a sequence of modulated data symbols to a sequence of zero pilot symbols, as depicted in 302. In 302, a symbol sequence may be output by inserting 0 at a pilot symbol position in the sequence of modulated data symbols. Then, in 304, an FTN data signal is generated by performing FTN pulse-shaping for data symbols on the output symbol sequence produced in 302.

Independently of the generation of the FTN data signal, pilot symbols are generated, as depicted in 301, and a sequence of generated pilot symbols is mapped to a sequence of zero data symbols, as depicted in 303. In 303, a symbol sequence may be output by inserting 0 at a data symbol position in the pilot symbol sequence. Then, in 305, interference on the pilot symbols by the FTN data signal is estimated, and a compensated pilot symbol sequence is generated to cancel the estimated interference, as depicted in 305. In 305, the signal transmission apparatus may receive the FTN data signal and the output symbol sequence, which is produced in 303, and generate a compensated pilot symbol sequence by subtracting a pilot symbol position value of the FTN data signal from the pilot symbol position in said output symbol sequence.

Thereafter, a pilot FTN transmission parameter is determined, as depicted in 306, and an FTN pilot signal in which no inter-pilot symbol interference occurs is generated by performing FTN pulse-shaping on the compensated pilot symbol sequence using the determined pilot FTN transmission parameter, as depicted in 307. In addition, the pilot FTN transmission parameter may be determined such that a product of the pilot FTN transmission parameter and the greatest common denominator of pilot symbol intervals becomes a positive integer. In this case, the greatest common denominator may not be 1.

In 307, the signal transmission apparatus may generate the FTN pilot signal by performing FTN pulse shaping on the compensated pilot symbol sequence, independently of the FTN pulse shaping of the data symbols. In 307, the signal transmission apparatus may perform the FTN pulse-shaping and pilot symbol placement such that both a first requirement that the pilot FTN transmission parameter is smaller than the data symbol FTN transmission parameter and a second requirement that the product of the pilot FTN transmission parameter and the greatest common denominator of the pilot symbol intervals is a positive integer can be meet. In 307, the pilot symbols may be placed so that the greatest common denominator of the pilot symbol intervals does not become 1.

Thereafter, the signal transmission apparatus generates a FTN transmission signal by combining the FTN data signal and the FTN pilot signal, as depicted in 308, and transmits the FTN transmission signal to the signal receiving apparatus, as depicted in 309.

According to the above exemplary embodiments, when an FTN signal is transmitted, pilot symbols of the signal are not distorted while efficiency of frequency usage is increased. At this time, pilot signals of a desired value can be transmitted without being distorted and without loss of an FTN transmission gain. Additionally, in an FTN-based broadcasting and communication system, it is possible to transmit pilot signals without distortion and without using an additional bandwidth. Furthermore, initial system synchronization and carrier phase synchronization are feasible using a conventional synchronization algorithm of a Nyquist transmission-based communication system.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A signal transmission apparatus comprising:
    a pilot interference estimator and compensator configured to estimate interference on pilot symbols by a Faster-Than-Nyquist (FTN) signal generated by FTN modulating a sequence of data symbols, and generate a compensated pilot symbol sequence to cancel the estimated interference;
    a pilot FTN modulator configured to generate an FTN pilot signal in which inter-pilot symbol interference does not occur, by performing FTN pulse-shaping on the compensated pilot symbol sequence; and
    a transmitter configured to transmit an FTN data signal and the FTN pilot signal.

2. The signal transmission apparatus of claim 1, further comprising:
    a data symbol modulator configured to modulate data symbols;
    a first symbol mapper configured to map a sequence of the modulated data symbols to a sequence of zero pilot symbols; and
    a data FTN modulator configured to generate the FTN data signal by performing FTN pulse-shaping on an output symbol sequence of the first symbol mapper, and provide the generated FTN data signal to the pilot interference estimator and compensator.

3. The signal transmission apparatus of claim 2, wherein the first symbol mapper is configured to output a symbol sequence by inserting 0 at a pilot symbol position in the sequence of modulated data symbols.

4. The signal transmission apparatus of claim 1, further comprising:
    a pilot symbol generator configured to generate the pilot symbols; and
    a second symbol mapper configured to map a sequence of generated pilot symbols to a sequence of zero data symbols and provide the pilot interference estimator and compensator with an output sequence resulting from the mapping.

5. The signal transmission apparatus of claim 4, wherein the second symbol mapper is configured to output a symbol sequence by inserting 0 at a data symbol position in the sequence of generated pilot symbols.

6. The signal transmission apparatus of claim 4, wherein the pilot interference estimator and compensator is configured to receive the FTN data signal and the output sequence of the second symbol mapper and generate the compensated pilot symbol sequence by subtracting a pilot symbol position value of the FTN data signal from the pilot symbol position of the output sequence of the second symbol mapper.

7. The signal transmission apparatus of claim 1, wherein the pilot FTN modulator is configured to generate the FTN pilot signal by performing FTN pulse-shaping on the compensated pilot symbol sequence from the pilot interference estimator and compensator, independently of FTN pulse-shaping on the data symbols.

8. The signal transmission apparatus of claim 1, wherein the pilot FTN modulator is configured to FTN pulse-shape a pilot compensation signal using a pilot FTN transmission parameter, in which the pilot FTN transmission parameter is smaller than a data symbol FTN transmission parameter.

9. The signal transmission apparatus of claim 1, wherein the pilot FTN modulator is configured to FTN pulse-shape a pilot compensation signal using a pilot FTN transmission parameter, wherein a product of the pilot FTN transmission parameter and a greatest common denominator of pilot symbol intervals is a positive integer.

10. The signal transmission apparatus of claim 9, wherein the pilot FTN modulator is configured to place the pilot signals such that the product of the pilot FTN transmission parameter and a greatest common denominator of pilot symbol intervals does not become 1.

11. The signal transmission apparatus of claim 1, wherein the pilot FTN modulator is configured to perform FTN pulse-shaping and pilot symbol placement such that both a first requirement that a pilot FTN transmission parameter is smaller than a data symbol FTN transmission parameter and a second requirement that a product of the pilot FTN transmission parameter and a greatest common denominator of pilot symbol intervals is a positive integer can be meet.

12. The signal transmission apparatus of claim 1, further comprising:
    a combiner configured to generate an FTN transmission signal by combining the FTN data signal and the FTN pilot signal and provide the generated FTN transmission signal to the transmitter.

13. A signal transmission method comprising:
    estimating interference on pilot symbols by a Faster-Than-Nyquist (FTN) signal generated by FTN modulating a sequence of data symbols, and generating a compensated pilot symbol sequence to cancel the estimated interference;
    determining a pilot FTN transmission parameter;
    generating an FTN pilot signal in which inter-pilot symbol interference does not occur, by performing FTN pulse-shaping on the compensated pilot symbol sequence; and
    transmitting an FTN data signal and the FTN pilot signal.

14. The signal transmission method of claim 13, further comprising:
    modulating data symbols and mapping a sequence of the modulated data symbols to a sequence of zero pilot symbols to produce a first output symbol sequence;
    generating the FTN data signal by performing FTN pulse-shaping on the first output symbol sequence; and
    generating pilot symbols and mapping a sequence of the generated data symbols to a sequence of zero data symbols to produce a second output symbol sequence.

15. The signal transmission method of claim 14, wherein the generation of the compensated pilot symbol sequence comprises receiving the FTN data signal and the second output sequence and generating the compensated pilot symbol sequence by subtracting a pilot symbol position value of the FTN data signal from the pilot symbol position of the second output sequence.

16. The signal transmission method of claim 13, wherein the pilot FTN transmission parameter is determined to be smaller than a data symbol FTN transmission parameter.

17. The signal transmission method of claim 13, wherein the pilot FTN transmission parameter is determined such that a product of the pilot FTN transmission parameter and a greatest common denominator of pilot symbol intervals is a positive integer.

18. The signal transmission method of claim 13, wherein the generation of the FTN pilot signal comprises performing FTN pulse-shaping on the compensated pilot symbol sequence from the pilot interference estimator and compensator, independently of FTN pulse-shaping on the data symbols.

19. The signal transmission method of claim 13, wherein the generation of the FTN pilot signal comprises performing FTN pulse-shaping and pilot symbol placement such that both a first requirement that a pilot FTN transmission parameter is smaller than a data symbol FTN transmission parameter and a second requirement that a product of the pilot FTN transmission parameter and a greatest common denominator of pilot symbol intervals is a positive integer can be meet.

20. The signal transmission method of claim 13, wherein the generation of the FTN pilot signal comprises placing the pilot signals such that the product of the pilot FTN transmission parameter and a greatest common denominator of pilot symbol intervals does not become 1.

\* \* \* \* \*